US010425960B2

(12) United States Patent
Bai et al.

(10) Patent No.: US 10,425,960 B2
(45) Date of Patent: *Sep. 24, 2019

(54) COMMUNICATION APPARATUS AND METHOD FOR PERFORMING INTER-VEHICULAR COMMUNICATION

(71) Applicant: HYUNDAI MOBIS CO., LTD., Seoul (KR)

(72) Inventors: Song Nan Bai, Yongin-si (KR); Jae Il Jung, Yongin-si (KR); Tae Won Kim, Yongin-si (KR); Won Jae Yi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,174

(22) Filed: Feb. 23, 2018

(65) Prior Publication Data

US 2018/0184442 A1 Jun. 28, 2018

Related U.S. Application Data

(63) Continuation of application No. 15/202,419, filed on Jul. 5, 2016, now Pat. No. 9,907,086, which is a (Continued)

(30) Foreign Application Priority Data

Nov. 29, 2013 (KR) .................. 10-2013-0147485

(51) Int. Cl.
*H04W 72/12* (2009.01)
*H04W 4/80* (2018.01)
(Continued)

(52) U.S. Cl.
CPC .. *H04W 72/1231* (2013.01); *G08G 1/096791* (2013.01); *G08G 1/163* (2013.01);
(Continued)

(58) Field of Classification Search
CPC ............... H04W 72/1231; H04W 4/80; H04W 28/0236; H04W 4/027; H04W 88/12;
(Continued)

(56) References Cited

U.S. PATENT DOCUMENTS 7,523,000 B2 4/2009 Tengler
8,233,389 B2 7/2012 Yim et al.
(Continued)

FOREIGN PATENT DOCUMENTS

CN 101926198 A 12/2010
CN 103209434 A 7/2013
(Continued)

OTHER PUBLICATIONS

Extended European Search Report dated Feb. 2, 2015 of corresponding European Patent Application No. 14165658.7—9 pages.
(Continued)

*Primary Examiner* — Faisal Choudhury
(74) *Attorney, Agent, or Firm* — Knobbe Martens Olson & Bear LLP

(57) ABSTRACT

A communication apparatus for inter-vehicular communication according to the present invention includes: a network state estimating unit configured to estimate network state information indicating a current network state based on driving information and channel state information of neighboring vehicles; a network access controller configured to control whether to transmit a message based on the network state information; a transmission scheduler configured to control a transmission time point of the message based on the network state information; and a transmission buffer unit (Continued)

configured to delay transmission of the message according to the control of the transmission time point of the transmission scheduler.

19 Claims, 6 Drawing Sheets

Related U.S. Application Data continuation of application No. 14/250,465, filed on Apr. 11, 2014, now Pat. No. 9,392,486.

(51) Int. Cl.

| | | |
|---|---|---|
| *H04W 4/46* | (2018.01) | |
| *G08G 1/0967* | (2006.01) | |
| *H04W 4/02* | (2018.01) | |
| *H04W 28/02* | (2009.01) | |
| *G08G 1/16* | (2006.01) | |
| *H04H 20/28* | (2008.01) | |
| *H04L 12/26* | (2006.01) | |
| *H04W 4/04* | (2009.01) | |
| *H04W 28/14* | (2009.01) | |
| *H04L 12/825* | (2013.01) | |
| *H04L 12/823* | (2013.01) | |
| *H04W 4/40* | (2018.01) | |
| *H04W 4/44* | (2018.01) | |
| *H04W 88/12* | (2009.01) | |

(52) U.S. Cl.
CPC ............ *H04H 20/28* (2013.01); *H04L 43/16* (2013.01); *H04L 47/25* (2013.01); *H04L 47/32* (2013.01); *H04W 4/027* (2013.01); *H04W 4/046* (2013.01); *H04W 4/40* (2018.02); *H04W 4/44* (2018.02); *H04W 4/46* (2018.02); *H04W 4/80* (2018.02); *H04W 28/021* (2013.01); *H04W 28/0236* (2013.01); *H04W 28/14* (2013.01); *H04W 88/12* (2013.01)

(58) Field of Classification Search
CPC ..... H04W 28/021; H04W 28/14; H04W 4/46; H04W 4/046; H04W 4/40; H04W 4/44; H04L 47/32; H04L 43/16; H04L 47/25; H04H 20/28
USPC ........................................................ 370/231
See application file for complete search history.

(56) References Cited

U.S. PATENT DOCUMENTS

| | | | |
|---|---|---|---|
| 2010/0312432 | A1 | 12/2010 | Hamada et al. |
| 2011/0044172 | A1* | 2/2011 | Yim ................ H04L 47/14 370/236 |
| 2012/0129459 | A1* | 5/2012 | Hsieh ............... H04W 52/282 455/66.1 |
| 2013/0172040 | A1 | 7/2013 | Yamamoto |
| 2013/0190025 | A1 | 7/2013 | Sakata |
| 2013/0310067 | A1 | 11/2013 | Nakata et al. |
| 2014/0004894 | A1 | 1/2014 | Yamamoto |
| 2014/0092735 | A1 | 4/2014 | Lee et al. |
| 2014/0119210 | A1 | 5/2014 | Bansal et al. |
| 2014/0350830 | A1 | 11/2014 | David |

FOREIGN PATENT DOCUMENTS

| | | |
|---|---|---|
| JP | 2011-130065 A | 6/2011 |
| KR | 10-2009-0044277 A | 5/2009 |

OTHER PUBLICATIONS

Karaginnis, Georgios et al., "Vehicular networking: A survey and tutorial on requirements, architectures, challenges, standards and solutions", Communication Surveys & Tutorials, IEEE 13.4, 2011, pp. 584-616.
Office Action dated Sep. 26, 2014 of corresponding Korean Patent Application No. 10-2013-0147485—4 pages.
Office Action dated Jun. 28, 2017 of corresponding Chinese Patent Application No. 201410112614.9—7 pages.
Office Action of corresponding Chinese Patent Application No. 201410112614.9—8 pages, (dated Feb. 8, 2018).

* cited by examiner

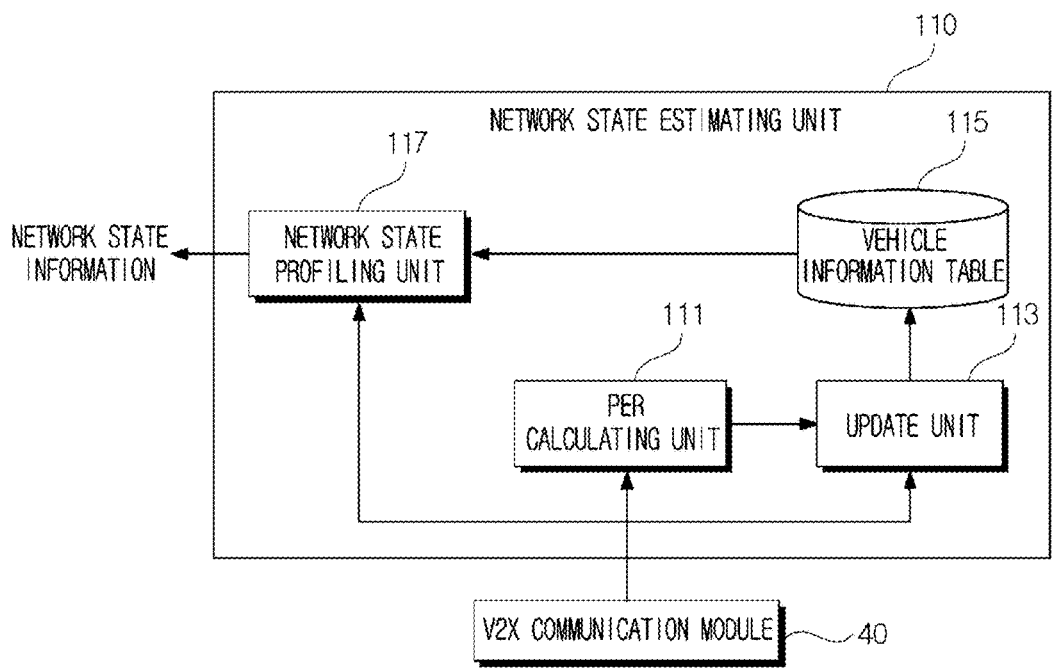

| DISTANCE | PER | CBR | Density |
|---|---|---|---|
| 10m | | | |
| 20m | | | |
| 30m | | | |
| ... | | | |
| | | | |

COMMUNICATION APPARATUS AND METHOD FOR PERFORMING INTER-VEHICULAR COMMUNICATION

CROSS-REFERENCE TO RELATED APPLICATIONS

This application claims priority to and the benefit of Korean Patent Application No. 10-2013-0147485 filed in the Korean Intellectual Property Office on Nov. 29, 2013, the entire contents of which are incorporated herein by reference.

TECHNICAL FIELD

The present invention relates to a communication apparatus and method for inter-vehicular communication, and more particularly, to a communication apparatus and method for a safety driving service using an inter-vehicular communication technology.

BACKGROUND ART

Recently, research on a safety driving service (cooperative collision avoidance, forward collision warning, lane change, and the like) using an inter-vehicular communication technology, such as IEEE 802.11P has been actively conducted. The purpose of the vehicle safety driving service is to provide a driver with a safer and more pleasant driving environment by inducing safe driving of a vehicle and improving a traffic congestion situation by monitoring a driving situation in real time through inter-vehicular short-range wireless communication.

The vehicle safety driving service generally has a function of periodically broadcasting a vehicle safety message to neighboring vehicles. The vehicle safety message basically includes a vehicle location vector and a time stamp, such as a location, a speed, and a movement direction of a vehicle. This enables each vehicle to recognize current driving situations of neighboring vehicles in real time, and rapidly responds to a dangerous situation, thereby helping to prevent an accident.

Accordingly, one of the significant factors for determining reliability of the safety driving service is reliable transception of a safety message. However, in a traffic congestion region in which there is a lot of vehicles, a channel load of a wireless network is rapidly increased due to transmission of the safety message without control, so that a network congestion phenomenon, such as an unlimited increase in a channel access delay or a sharp increase in a packet loss, is generated. The phenomenon may cause a fatal defect to the safety driving service close to a life of a driver.

SUMMARY OF THE INVENTION

The present invention has been made in an effort to provide a communication apparatus and method capable of performing congestion control, which may satisfy requirements of an application service while avoiding a network congestion situation in inter-vehicular communication.

An exemplary embodiment of the present invention provides a communication apparatus for inter-vehicular communication, including: a network state estimating unit configured to estimate network state information indicating a current network state based on driving information and channel state information of neighboring vehicles; a network access controller configured to control whether to transmit a message based on the network state information; a transmission scheduler configured to control a transmission time point of the message based on the network state information; and a transmission buffer unit configured to delay transmission of the message according to the control of the transmission time point of the transmission scheduler.

The network state information may include at least one of a packet error rate, a channel busy ratio, and a vehicle density.

The network state information may include at least one of a packet error rate, a channel busy ratio, and a vehicle density corresponding to a predetermined distance range from a driver's own vehicle.

The predetermined distance range may be determined according to whether a change in at least one of the packet error rate, the channel busy ratio, and the vehicle density for each distance range from the driver's own vehicle exceeds a predetermined threshold value.

The network access controller may determine a transmission probability according to at least one of the pack error rate and the channel busy ratio, and transmit a message according to the determined transmission probability.

The network access controller may determine the transmission probability according to a tracking error rate of the vehicle.

The transmission scheduler may calculate a delay time according to at least one of the packet error rate and the vehicle density, and the transmission buffer unit may delay transmission of the message by the calculated delay time.

The transmission scheduler may determine transmission power or a data rate of the message according to at least one of the packet error rate and the vehicle density.

The transmission scheduler may determine the transmission power according to a distance of a tracking target vehicle.

The transmission scheduler may determine lengths of time slots forming a time frame according to the determined data rate, determine an arbitrary idle time slot among the time slots forming the time frame as a time slot to transmit the message, and calculate a delay time corresponding to the determined time slot.

The transmission buffer unit may delay transmission of the message by the calculated delay time.

Another exemplary embodiment of the present invention provides a communication method for inter-vehicular communication, including: estimating network state information indicating a current network state based on driving information and channel state information of neighboring vehicles; controlling whether to transmit a message based on the network state information; controlling a transmission time point of the message based on the network state information; and delaying transmission of the message according to the control of the transmission time point.

The network state information may include at least one of a packet error rate, a channel busy ratio, and a vehicle density.

The network state information may include at least one of a packet error rate, a channel busy ratio, and a vehicle density corresponding to a predetermined distance range from a driver's own vehicle.

The predetermined distance range may be determined according to whether a change in at least one of the packet error rate, the channel busy ratio, and the vehicle density for each distance range from the driver's own vehicle exceeds a predetermined threshold value.

The controlling whether to transmit may determine a transmission probability according to at least one of the pack error rate and the channel busy ratio, and transmit a message according to the determined transmission probability.

The controlling whether to transmit may determine the transmission probability according to a tracking error rate of the vehicle.

The controlling a transmission time point may calculate a delay time according to at least one of the packet error rate and the vehicle density, and the delaying may delay transmission of the message by the calculated delay time.

The controlling a transmission time point may determine transmission power or a data rate of the message according to at least one of the packet error rate and the vehicle density.

The controlling a transmission time point may determine the transmission power according to a distance of a tracking target vehicle.

The controlling a transmission time point may determine lengths of time slots forming a time frame according to the determined data rate, determine an arbitrary idle time slot among the time slots forming the time frame as a time slot to transmit the message, and calculate a delay time corresponding to the determined time slot.

The delaying may delay transmission of the message by the calculated delay time.

According to the exemplary embodiment of the present invention, whether to transmit a message and a transmission time point of the message may be controlled considering a network state in inter-vehicular communication, thereby satisfying requirements of an application service while avoiding a network congestion situation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a diagram illustrating a detailed configuration of a network state estimating unit 110 according to the exemplary embodiment of the present invention.

FIG. 3 is a table illustrating an example of a lookup table managed in a vehicle information table 115.

Figure 1:
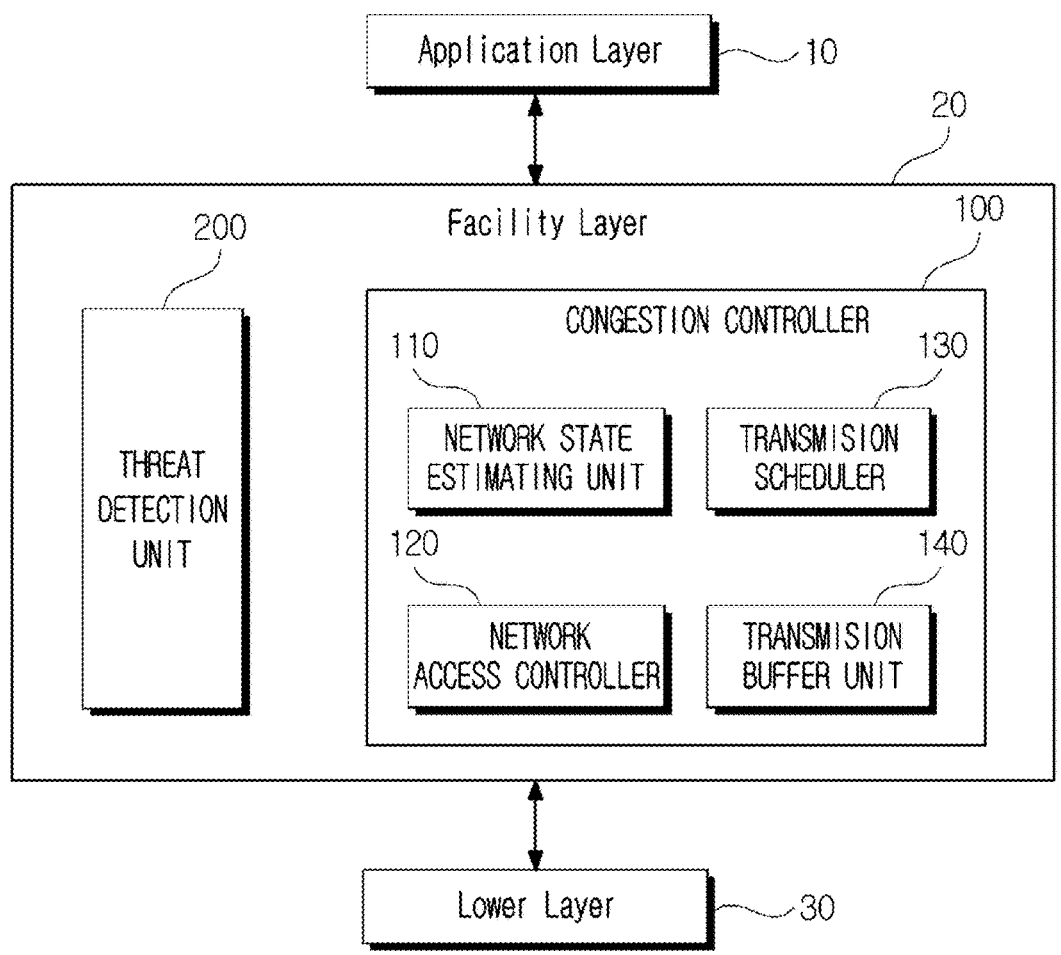
FIG. 1 is a diagram illustrating a configuration of a communication apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment according to the present invention will be described in detail with reference to the accompanying drawings. First, in denoting reference numerals to constitutional elements of respective drawings, the same elements will be designated by the same reference numerals although they are shown in different drawings. In the following description of the present invention, a detailed description of known configurations or functions incorporated herein will be omitted when it is determined that the detailed description may make the subject matter of the present invention unclear. An exemplary embodiment of the present invention will be described below, but the technical spirit of the present invention is not limited thereto and may be modified and variously implemented by those skilled in the art.

FIG. 1 is a diagram illustrating a configuration of a communication apparatus according to an exemplary embodiment of the present invention. The communication apparatus includes an application layer 10 providing an application service, a facility layer 20 performing a threat detection function, a congestion control function, and the like, and a lower layer 30. The lower layer 30 may include, for example, a network layer, a data link layer, and a physical layer.

The facility layer 20 includes a threat detection unit 200 tracking vehicles and detecting a threat based on messages received from neighboring vehicles, and a congestion controller 100 performing the congestion control function, such as management of a state of a network formed of neighboring vehicles and control of transmission of a message transceived for an application service.

The congestion controller 100 includes a network state estimating unit 110, a network access controller 120, a transmission scheduler 130, and a transmission buffer unit 140.

The network state estimating unit 110 estimates network state information indicating a current network state based on driving information and channel state information about the neighboring vehicles recognized through the messages received from the neighboring vehicles.

The network access controller 120 controls whether to transmit a message transmitted from an application service based on the network state information from the network state estimating unit 110.

The transmission scheduler 130 controls a transmission time point of the message based on the network state information from the network state estimating unit 110.

The transmission buffer unit 140 transfer-delays the message by delaying transmission of the safety message according to control of the transmission time point by the transmission scheduler 130.

In the exemplary embodiment of the present invention, the message is periodically (for example, 100 ms) generated by the application service, and the generated message is transmitted or discarded through the network access controller 120, and transfer-delayed through the transmission scheduler 130 and the transmission buffer unit 140.

FIG. 2 is a diagram illustrating a detailed configuration of the network state estimating unit 110 according to the exemplary embodiment of the present invention. The network state estimating unit 110 includes a PER calculating unit 111, a table update unit 113, a vehicle information table 115, and a network state profiling unit 117.

The vehicle information table 115 maintains and manages driving information and change state information about each vehicle, for example, an identification (remote vehicle ID (RVID)), a location, a speed, a direction, a distance, a time stamp, a packet error rate (PER), a received signal strength indicator (RSSI) of each vehicle, in real time based on the messages received from the neighboring vehicles. FIG. 3 is a table illustrating an example of a lookup table managed in the vehicle information table 115.

The table update unit 113 updates the vehicle information table 115 whenever the message is received or periodically based on a PER of each vehicle calculated by the PER calculating unit 111 to be described below and contents of a message received through a V2X communication module 40 included in the vehicle. When a certain entry of the vehicle information table 115 is not updated for a predetermined time, the table update unit 113 deletes the corresponding entry.

The PER calculating unit 111 calculates a PER of each vehicle based on the contents of the message received through the V2X communication module 40. The PER calculating unit 111 may calculate a PER of a corresponding vehicle by using a message counter corresponding to a message for each vehicle. For example, the PER of the vehicle may be calculated through an Equation below. The Equation below represents a PER per second considering that the message generated by the application service generally includes the message counter, and the message counter has a value between, for example, 0 to 127, and is circularly assigned.

$$PER_{RY_i} = \begin{cases} \dfrac{\Sigma(\text{Current}_{RV_i} - \text{Previous}_{RV_i} - 1)}{|\text{Current}_{SV_i} - \text{Init}_{RV_i} + 1|}, & \text{Current}_{SV_i} > \text{Previous}_{SV_i} \\ \dfrac{\Sigma(\text{Current}_{SV_i} - \text{Previous}_{RV_i} + 127)}{|\text{Current}_{RV_i} - \text{Init}_{SV_i} + 1|}, & \text{Current}_{SV_i} \leq \text{Previous}_{RV_i} \end{cases}$$ [Equation 1]

Here, $RV_i$ indicates an $i^{th}$ vehicle, and $PERRV_i$ indicates a PER of the $i^{th}$ vehicle. $CurrentRV_i$ indicates a message counter of a currently received message, and $PreviousRV_i$ indicates a message counter of a message received immediately before the currently received message (accordingly, after the calculation of the PER each time, a current value of $PreviousRV_i$ is changed to a value of $CurrentRV_i$ immediately before currently received message). $InitRV_i$ corresponds to $PreviousRV_i$ every one second.

The V2X communication module 40 provides the PER calculating unit 111 and the table update unit 113 with the contents of the message as described above, and also calculates a channel busy ratio (CBR) in the unit of a predetermined time (for example, 50 ms) through a clear channel assessment (CCA) function and provides the network state profiling unit 117 to be described below with the calculated CBR.

The network state profiling unit 117 estimates the network state information indicating the current network state based on the vehicle driving information and the channel state information of the vehicle information table 115, and the CBR information provided from the V2X communication module 40. The network state based on a driver's own vehicle is changed in real time according to a movement environment (fading, a multipath, fluidity, and the like) of the vehicle, and the network state profiling unit 117 profiles the current network state and estimates information representing the state as the network state information.

In the exemplary embodiment of the present invention, the network state profiling unit 117 calculates a PER, a CBR, and a vehicle density (hereinafter, referred to as a "Density") of a network within a corresponding distance range (that is, a network formed of nodes within the corresponding distance range) for each predetermined distance range based on a driver's own vehicle, based on the vehicle driving information and the channel state information of the vehicle information table 115 and the CBR information. For example, when it is assumed that a distance unit is 10 m, the network state profiling unit 117 calculates a PER, a CBR, and a Density of the network at each of a distance range of 10 m, a distance range of 20 m, and a distance range of 30 m.

The PER of the network may be calculated by an average of PER values of vehicles within the corresponding distance range. The Density of the network may be calculated by a ratio of the number of vehicles within the corresponding distance range and an area of the corresponding distance range.

The CBR of the network may be calculated by a maximum value among CBR values measured in nodes included in the corresponding network. To this end, in the exemplary embodiment of the present invention, each of the nodes inserts the CBR value measured by each node into the message and transmits the message, thereby sharing the CBR value. The CBR of the network may be represented by Equation 2 below.

$$CBR_{net} = MAX[CBR_i]$$ [Equation 2]

Here, $CBR_i$ indicates a CBR value measured in an $i^{th}$ node (including the node itself) of a corresponding network.

Figures 4, 5:
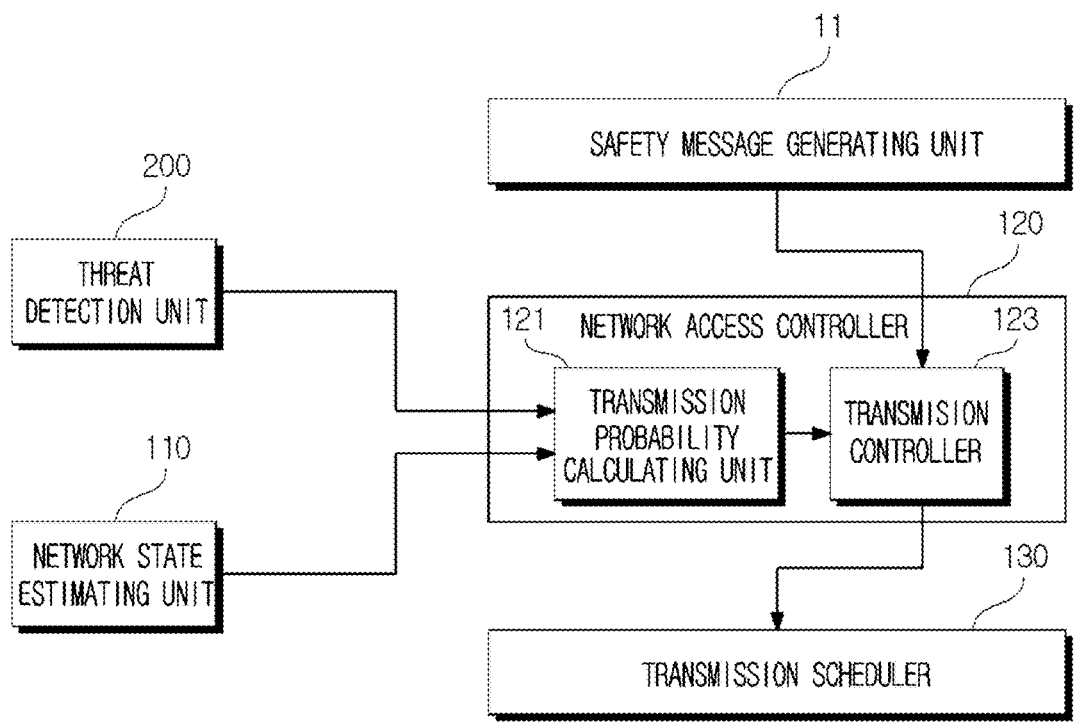
FIG. 4 is a table illustrating one example of a lookup table managed by a network state profiling unit 117.
FIG. 5 is a diagram illustrating a detailed configuration of a network access controller 120 according to the exemplary embodiment of the present invention.

The network state profiling unit 117 may calculate a PER, a CBR, and a Density for each predetermined distance range as described above, and maintain/mange the calculated PER, CBR, and Density in a form of a lookup table as illustrated in FIG. 4.

When the PER, the CBR, and the Density are given for each network specified by the distance range as described above, there may incur a phenomenon that the PER, the CBR, and the Density are remarkably increased in a specific network. For example, the PER value in the network within the distance range of 40 m is a very small value corresponding to 0.1, but the PER value in the network is increased to 0.5 in the network within the distance range of 50 m, or the Density in the network within the distance range of 40 m is 5, but the PER value in the network is increased to 15 in the network within the distance range of 50 m. This means that network congestion is relatively less in the distance range of 40 m, but when the distance range exceeds 50 m, the network congestion is sharply increased.

Accordingly, the network state profiling unit 117 searches for a distance range (network) in which at least one value of the PER, the CBR, and the Density is remarkably distinguished, and estimates the PER, the CBR, and the Density of a network immediately before the distinguishment as the network state information indicating the current network state. Whether the values of the PER, the CBR, and the Density are remarkably distinguished may be determined according to whether ΔPER, ΔCBR, and ΔDensity, which are differences between the PER, the CBR, and the Density of a specific distance range and the PER, the CBR, and the Density of a next distance range, exceed predetermined threshold values. Whether the network is distinguished may be determined based on whether any one of ΔPER, ΔCBR, and ΔDensity exceeds the threshold value, and may also be determined based on whether all of ΔPER, ΔCBR, and ΔDensity exceed the threshold values.

FIG. 5 is a diagram illustrating a detailed configuration of the network access controller 120 according to the exemplary embodiment of the present invention. The network access controller 120 includes a transmission probability calculating unit 121 and a transmission controller 123.

In the exemplary embodiment of the present invention, the threat detection unit 200 calculates tracking error information, for example, a tracking error rate, and provides the calculated the tracking error information during a process of tracking the neighboring vehicles.

The transmission probability calculating unit 121 calculates a message transmission probability based on the tracking error information from the threat detection unit 200 and the network state information from the network state estimating unit 110. The transmission controller 123 determines whether to transmit or discard the message according to the calculated transmission probability.

When the network state is poor, it is necessary to decrease the transmission of the message, so that the transmission probability needs to be decreased, and when the tracking error rate is large, more messages are required for accurate tracking, so that the transmission probability needs to be increased. Accordingly, in the exemplary embodiment of the present invention, the PER and the CBR, which are the network state information from the network state estimating unit 110 and the tracking error rate from the threat detection unit 200 are used as a reference for determining the transmission probability.

As an example, the transmission probability calculating unit 121 may define a transmission probability corresponding to the PER and CBR values serving as the reference, and decrease the transmission probability by a predetermined rate whenever the PER and CBR values from the network state estimating unit 110 exceed predetermined threshold values. The transmission probability calculating unit 121 may define a transmission probability corresponding to the tracking error rate serving as the reference, and increase the transmission probability by a predetermined rate whenever the tracking error rate from the threat detection unit 200 exceeds predetermined threshold values.

As another example, a calculation formula of calculating a transmission probability according to the network state information and the tracking error rate is predefined, so that the transmission probability calculating unit 121 may also calculate the transmission probability according to the calculation formula. In this case, different weights may be assigned to the PER, the CBR, and the tracking error rate, and for example, a transmission probability PTx may be calculated by Equation 3 below.

$$p_{Tx} = 1 - (PER_{net} \times w_1 + CBR_{net} \times w_2 + (1 - TE_{net}) \times w_3),$$

$$1 = w_1 + w_2 + w_3 \quad \text{[Equation 3]}$$

Here, $PER_{net}$, $CBR_{net}$, and $TE_{net}$ indicate a PER, a CBR, and a tracking error rate of a corresponding network, respectively, and $w_1$, $w_2$, and $w_3$ indicate weights corresponding to a PER, a CBR, and a tracking error rate, respectively. Values of $w_1$, $w_2$, and $w_3$ may be predefined.

When a message is transmitted from the safety message generating unit 11, the transmission controller 123 generates a random number between 0 and 1, and when the random number is larger than the transmission probability from the transmission probability calculating unit 121, the transmission controller 123 transmits the message to the transmission scheduler 130, and when the random number is not larger than the transmission probability, the transmission controller 123 discards (deletes) the message. Accordingly, the message periodically generated by the safety message generating unit 11 is transmitted to the outside as the transmission probability calculated by the transmission probability calculating unit 121.

Figure 6:
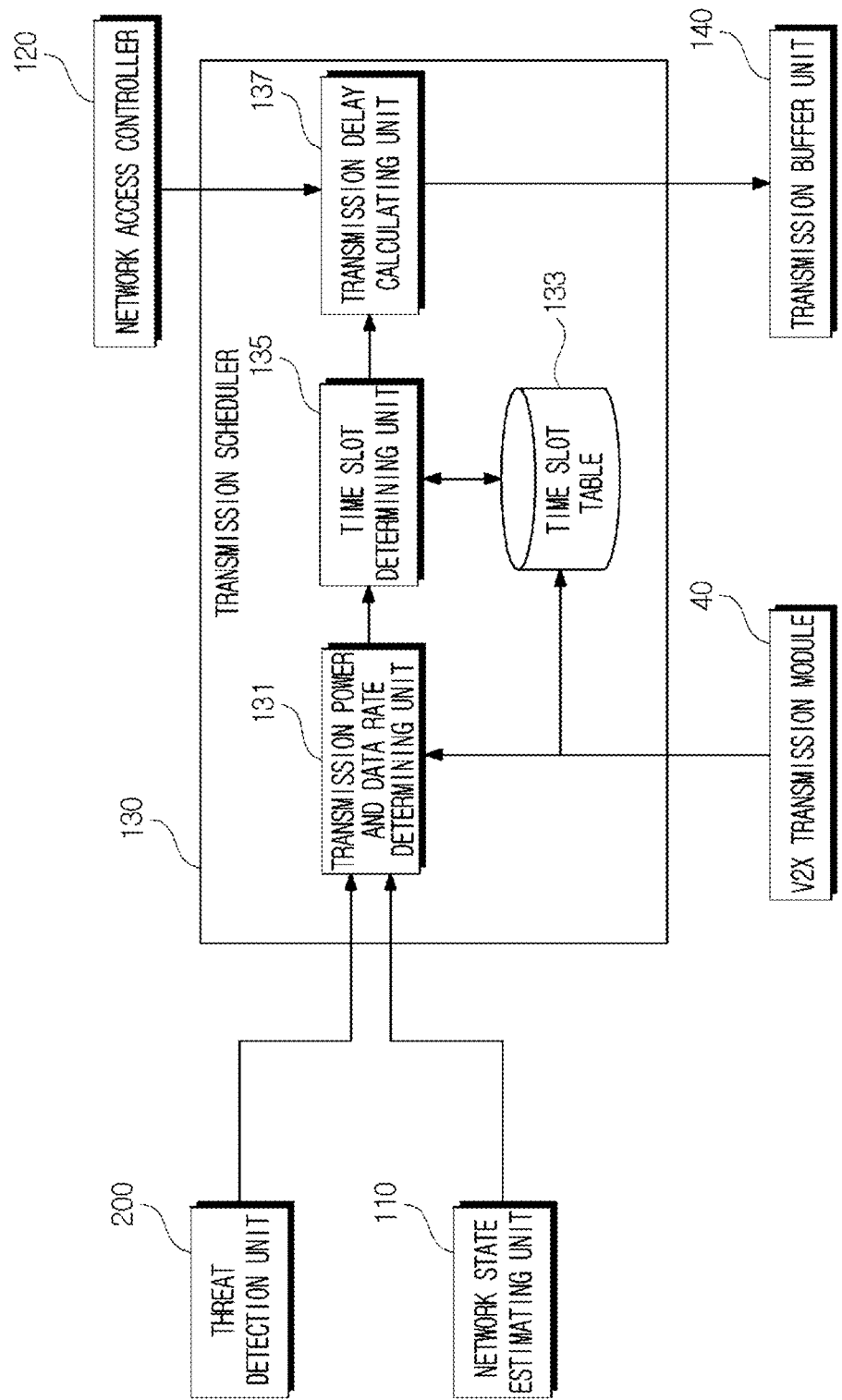
FIG. 6 is a diagram illustrating a detailed configuration of a transmission scheduler 130 according to the exemplary embodiment of the present invention.

FIG. 6 is a diagram illustrating a detailed configuration of the transmission scheduler 130 according to the exemplary embodiment of the present invention. The transmission scheduler 130 includes a transmission power and data rate determining unit 131, a time slot table 133, a time slog determining unit 135, and a transmission delay calculating unit 137. The transmission scheduler 130 determines a time frame for transmitting the message based on the vehicle tracking information (for example, a location and a distance of a tracking target vehicle, and a tracking error rate) provided from the threat detection unit 200 and the network state information provided from the network state estimating unit 110, and determines a delay time for a delay-transfer based on the time frame.

The transmission power and data rate determining unit 131 determines transmission power and a data rate of the message based on the distance of the tracking target vehicle (for example, a maximum distance with the tracking target vehicle) provided from the threat detection unit 200 and the PER and the Density provided from the network state estimating unit 110.

When the network state is poor, the transmission distance needs to be decreased (that is, transmission power is decreased), or a transmission time (time for transmission) needs to be decreased. When the distance with the tracking target vehicle is large, the transmission distance needs to be increased. In the meantime, the transmission time is inversely proportional to the transmission rate, that is, the data rate. Accordingly, the transmission power and data rate determining unit 131 determines the transmission power and the data rate so that, as the PER value, the CBR value, or the Density value of the network state information is large, the transmission power is decreased or the data rate is increased. The transmission power and data rate determining unit 131 determines the transmission power so that, as the distance with the tracking target vehicle is large, the transmission power is increased. The determination of the transmission power and the data rate may be determined for each time frame to be described below.

As one example, the transmission power and data rate determining unit 131 may define transmission power and data rates corresponding to the values of the PER, the CBR, the Density, and the tracking distance serving as the reference, and decrease the transmission power by a predetermined rate or increase the data rate by a predetermined rate whenever the values of the PER, the CBR, and the Density from the network state estimating unit 110 exceed the predetermined threshold values. The transmission power and data rate determining unit 131 may increase the transmission power by a predetermined rate whenever a value of the tracking distance exceeds predetermined threshold values. The value of the transmission power is provided to the V2X communication module 40, and the value of the data rate is provided to the safety message generating unit 11, so that the message is encoded at the corresponding data rate and the message is transmitted with the corresponding transmission power.

The time slot table 133 maintains/manages a virtual time frame for transmitting the message and information about time slots within the time frame. The time slot determining unit 135 defines time slots within the time frame, and determines a time slot to transmit the message among the time slots.

Figure 7:
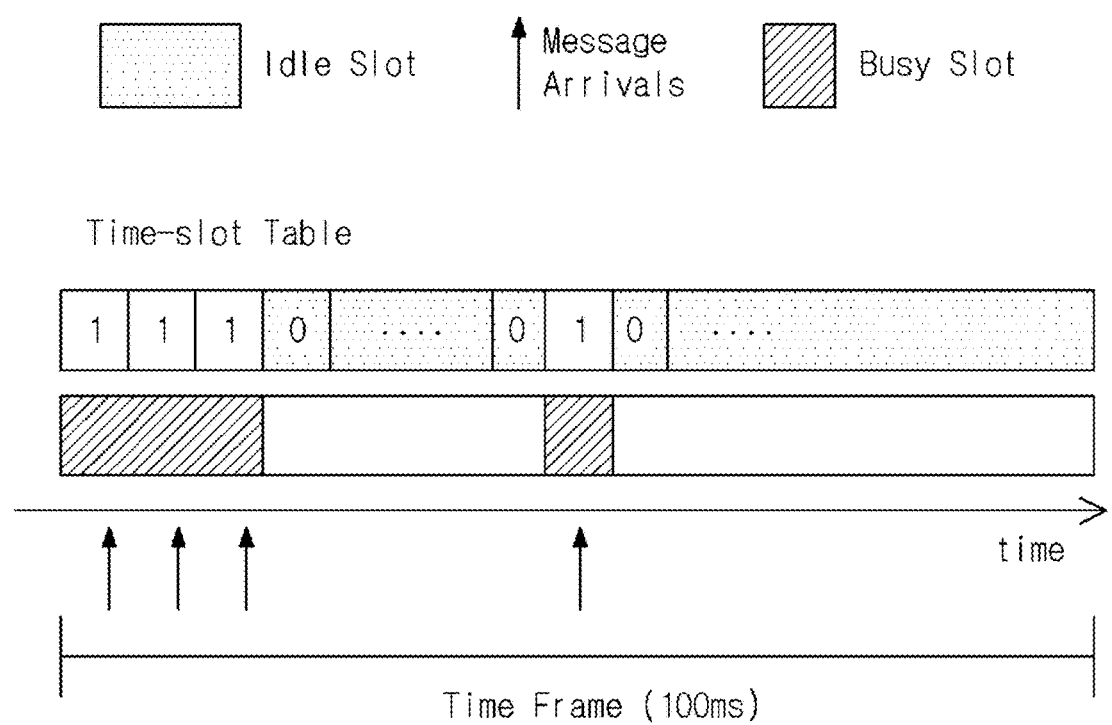
FIG. 7 is a diagram illustrating an example of a time frame and a time slot managed in a time slot table 133.

FIG. 7 is a diagram illustrating an example of a time frame and a time slot managed in the time slot table 133. The time frame is a section in which nodes within the network transmit one or more messages, and for example, a length of one time frame may be 100 ms. The length of the time slot is determined according to a transmission time of one message. That is, the transmission time corresponding to a data rate of the message is a length of the time slot. Accordingly, the time slot determining unit 135 determines a length of the time slot corresponding to the value of the data rate provided from the transmission power and data rate determining unit 131, and divides the section of the time frame into time slots to form the time frame. For example, when a length of the time frame is 100 ms, and the length of the time slot is 10 ms, the time frame is formed of 10 time slots. The time slot determining unit 135 may detect whether a message is received through the V2X communication module 40 (for example, a start point and an end point of the received message), and discriminate a time slot currently receiving the message from a time slot currently receiving no message and manage time slots. For example, as illustrated in FIG. 7, the time slot currently receiving the message is expressed by "1" (busy slot), and an idle time slot currently receiving no message is expressed by "0" (idle slot), so that the corresponding information may be maintained in the time slot table 133. The time slot table may be periodically updated. For example, whenever 10 time frames elapse, the time frame may be updated.

In order to prevent a collision, the message needs to be transmitted through the time slot currently receiving no message (that is, the idle state). Accordingly, the time slot determining unit 135 determines one among the time slots in the idle state as a time slot to transmit the message. For example, the time slot determining unit 135 may randomly select one among the time slots in the idle state.

The transmission delay calculating unit 137 calculates a delay time corresponding to the time slot determined by the time slot determining unit 135. The delay time may be calculated according to an order of the determined time slot in the time frame. The calculated delay time value is provided to the transmission buffer unit 140 together with the message from the network access controller 120.

Figure 8:
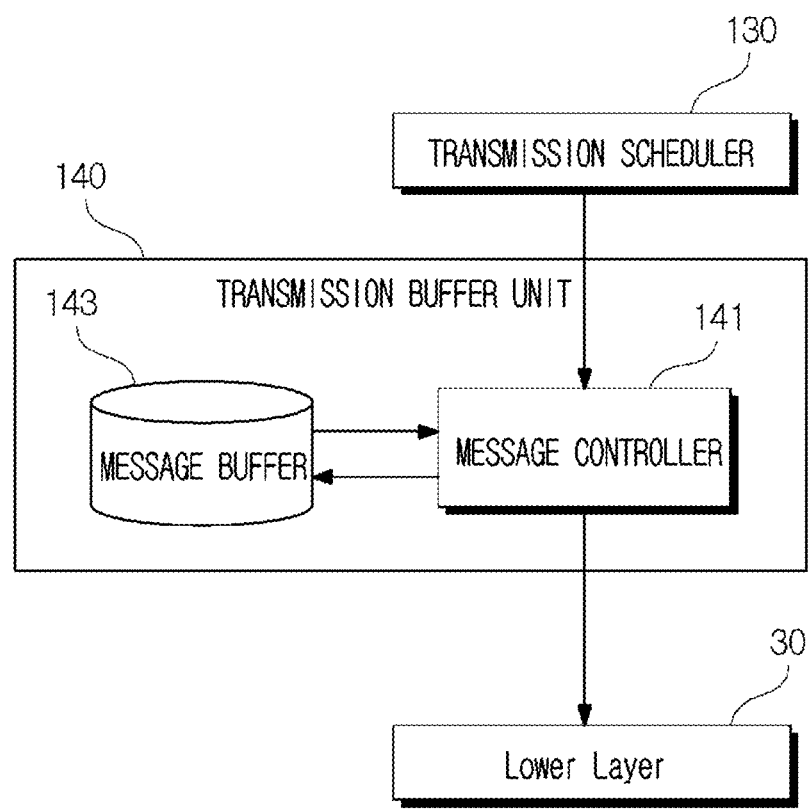
FIG. 8 is a diagram illustrating a detailed configuration of a transmission buffer unit 140 according to the exemplary embodiment of the present invention.

FIG. 8 is a diagram illustrating a detailed configuration of the transmission buffer unit 140 according to the exemplary embodiment of the present invention. The transmission buffer unit 140 includes a message controller 141 and a message buffer 143.

The message transmitted from the transmission scheduler 130 is basically stored in the message buffer 143. When the message is received, the message controller 141 first identifies whether the message is stored in the message buffer 143. When the message is not stored in the message buffer 143, the message controller 141 stores the received message in the message buffer 143, and delays the message for the delay time provided from the transmission scheduler 130, and then transmits the message stored in the message buffer 143 to the lower layer 30.

When the message is stored in the message buffer 143, the message controller 141 deletes the message stored in the message buffer 143, stores the received message in the message buffer 143, delays the message for the delay time provided from the transmission scheduler 130, and then transmits the message stored in the message buffer 143 to the lower layer 30. As described above, the message controller 141 deletes the message stored in the message buffer 143 and transmits the new message, so that the newest information is always provided to the neighboring vehicles.

According to the exemplary embodiment of the present invention, network state information about a network within a corresponding distance range is obtained for each distance range, and current network state information is estimated based on a section in which the network state information is remarkably changed, thereby effectively controlling a transmission probability of a message, message transmission scheduling, and the like by considering a network congestion state changed in real time. Transmission power or a data rate is adjusted by using the network state information and vehicle tracking information, thereby improving stability of an application service. It is possible to effectively adjust a channel load and perform improved congestion control through a virtual time frame and time slot.

Next, a method of operating the communication apparatus of FIG. 1 will be described. The method will be described with reference to FIG. 1.

First, the network state estimating unit 110 estimates network state information indicating a current network state based on driving information and channel state information of neighboring vehicles.

The network state information may include at least one of a packet error rate, a channel busy ratio, and a vehicle density.

The network state information may include at least one of a packet error rate, a channel busy ratio, and a vehicle density corresponding to a predetermined distance range from a driver's own vehicle.

The predetermined distance range may be determined according to whether a change in at least one of the packet error rate, the channel busy ratio, and the vehicle density for each distance range from the driver's own vehicle exceeds a predetermined threshold value.

When the network state information is estimated by the network state estimating unit 110, the network access controller 120 controls whether to transmit a message based on the network state information, and the transmission scheduler 130 controls a transmission time point of the message based on the network state information.

The network access controller 120 may determine a transmission probability according to at least one of the pack error rate and the channel busy ratio, and transmit a message according to the determined transmission probability.

The network access controller 120 may determine the transmission probability according to a tracking error rate of the vehicle.

The transmission scheduler 130 may calculate a delay time according to at least one of the packet error rate and the vehicle density.

The transmission scheduler 130 may determine transmission power or a data rate of the message according to at least one of the packet error rate and the vehicle density.

The transmission scheduler 130 may determine the transmission power according to a distance of a tracking target vehicle.

The transmission scheduler 130 may determine lengths of time slots forming a time frame according to the determined data rate, determine an arbitrary idle time slot among the time slots forming the time frame as a time slot to transmit the message, and calculate a delay time corresponding to the determined time slot.

After the transmission scheduler 130 controls a transmission time point of the message, the transmission buffer unit 140 delays transmission of the message according to the control of the transmission time point.

The transmission buffer unit 140 may delay transmission of the message by the calculated delay time.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating a vehicle, the method comprising:
   generating a first vehicle safety message of the vehicle that comprises an identification of the vehicle, location information of the vehicle at a first time, a speed of the vehicle at the first time, a movement direction of the vehicle at the first time, a first time stamp indicative of the first time, a first message counter of the first vehicle safety message;
   wirelessly receiving vehicle safety messages from nearby vehicles, each vehicle safety message comprising identification of a nearby vehicle transmitting the particular vehicle safety message, location information of the nearby vehicle, a speed of the nearby vehicle, a movement direction of the nearby vehicle, a time stamp, and a message counter of the particular vehicle safety message;
   computing transmission probability (PTX) using a tracking error (TE) such that the higher the TE is, the higher the PTX becomes;
   determining, based on the PTX, whether to transmit the first vehicle safety message of the vehicle;
   computing a first delay time for transmitting the first vehicle safety message of the vehicle;
   temporarily storing the first vehicle safety message of the vehicle in a buffer; and
   subsequent to temporarily storing the first vehicle safety message and subsequent to computing the first delay time, transmitting the first vehicle safety message of the vehicle according to the first delay time.

2. The method of claim 1, wherein determining whether to transmit the first vehicle safety message of the vehicle comprises:
   generating a random number; and
   comparing the random number against the PTX for the determination.

3. The method of claim 2, wherein transmission of the first vehicle safety message is determined when the random number is greater than $P_{TX}$, wherein no transmission is determined when the random number is smaller than $P_{TX}$.

4. The method of claim 1, wherein the first vehicle safety message of the vehicle is generated prior to determining whether to transmit.

5. The method of claim 1, further comprising:
   prior to temporarily storing the first vehicle safety message in the buffer, deleting a previously stored message from the buffer.

6. The method of claim 1, further comprising:
   processing the received vehicle safety messages for generating a packet error rate (PER) and a density, wherein the PER is generated for each nearby vehicle and represents an error rate of receiving vehicle safety messages from each nearby vehicle, wherein the density represents a count of vehicles within a range.

7. The method of claim 6, wherein the $P_{TX}$ is computed using PER in addition to TE.

8. The method of claim 6, further comprising adjusting a wireless transmission data rate for transmitting the first vehicle safety message of the vehicle in view of at least one of the PER and the density.

9. The method of claim 6, further comprising adjusting a wireless transmission power for transmitting the first vehicle safety message of the vehicle in view of at least one of the PER and the density.

10. The method of claim 6, further comprising processing the received vehicle safety messages for generating a channel busy ratio (CBR), in addition to generating the PER and the density, wherein the CBR represents a ratio of busy time within a timeframe.

11. The method of claim 10, wherein the first vehicle safety message further comprises the CBR generated using the received vehicle safety messages.

12. The method of claim 10, further comprising adjusting a wireless transmission power for transmitting the first vehicle safety message of the vehicle in view of at least one of the PER, the CBR and the density, wherein the wireless transmission power is adjusted such that the higher the CBR, the lower the wireless transmission power becomes.

13. The method of claim 6, further comprising:
defining timeframes in view of the received vehicle safety messages such that each timeframe comprises a plurality of timeslots, each timeslot for transmitting a vehicle safety message of the vehicle or for receiving a vehicle safety message of a nearby vehicle;
determining, based on the $P_{TX}$, whether to transmit a vehicle safety message of the vehicle for a first timeframe;
subsequent to determining for a transmission in the first timeframe, selecting a first one of the plurality of timeslots within the first timeframe available for transmitting the first vehicle safety message; and
subsequent to selecting the first timeslot, computing the first delay time to the first timeslot of the first timeframe.

14. The method of claim 13, further comprising:
generating and updating a timeslot table using the received vehicle safety messages such that an idle timeslot is distinguished from a busy timeslot,
wherein selecting the first timeslot for transmitting the first vehicle safety message is made with reference to the timeslot table.

15. The method of claim 14, wherein selecting the first timeslot comprises:
identifying idle timeslots from the timeslot table; and
choosing the first timeslot among the identified idle timeslots.

16. The method of claim 14, wherein selecting the first timeslot comprises:
identifying idle timeslots from the timeslot table; and
randomly choosing the first timeslot among the identified idle timeslots.

17. The method of claim 13, wherein selecting the first timeslot comprises:
identifying idle timeslots that are used for receiving a vehicle safety message from a nearby vehicle; and
choosing the first timeslot among the identified idle timeslots for transmitting the first vehicle safety message within the first timeframe.

18. The method of claim 13, further comprising adjusting a wireless transmission power for transmitting the first vehicle safety message of the vehicle in view of at least one of the PER and the density.

19. The method of claim 1, further comprising:
generating a second vehicle safety message of the vehicle comprising an identification of the vehicle, location information of the vehicle at a second time, a speed of the vehicle at the second time, a movement direction of the vehicle at the second time, a second time stamp indicative of the second time, and a second message counter of the second vehicle safety message;
computing a second delay time for transmitting the second vehicle safety message of the vehicle;
temporarily storing the second vehicle safety message of the vehicle in the buffer; and
subsequent to temporarily storing and computing the second delay time, transmitting the second vehicle safety message of the vehicle according to the second delay time.

* * * * *